Sept. 1, 1970         D. C. YOUNG         3,526,650
BIS-PI-CARBOLLYL COMPLEXES OF GROUP VIII NOBLE METALS
Filed July 18, 1968                    2 Sheets-Sheet 1

FIG-1

INVENTOR.
DONALD C. YOUNG
BY
ATTORNEY

Sept. 1, 1970  D. C. YOUNG  3,526,650
BIS-PI-CARBOLLYL COMPLEXES OF GROUP VIII NOBLE METALS
Filed July 18, 1968  2 Sheets-Sheet 2

○ - BORON ATOM
● - CARBON ATOM
◐ - BORON OR CARBON ATOM
○ - X, Y, R OR R'
   X, Y, R OR R'

INVENTOR.
DONALD C. YOUNG
BY
ATTORNEY 3,526,650
BIS-PI-CARBOLLYL COMPLEXES OF
GROUP VIII NOBLE METALS
Donald C. Young, Fullerton, Calif., assignor to Union
Oil Company of California, Los Angeles, Calif., a corporation of California
Filed July 18, 1968, Ser. No. 745,946
Int. Cl. C07f 5/02, 15/02; C07d 107/00
U.S. Cl. 260—429        8 Claims

ABSTRACT OF THE DISCLOSURE

The invention comprises a new class of Group VIII noble metal complexes which are bis-carbollyl noble metal complexes. The complexes have the empirical formula:

$$M[((BX)_m(BR_1)_n(CR_2)_o(BY)_p)]$$

wherein:

M is a Group VIII noble metal;
Y is a ligand having from 2 to about 10 carbons and at least one atom that is halogen, oxygen, nitrogen, sulfur or trivalent phosphorus, bismuth, arsenic or antimony;
$R_1$ has from 1 to about 6 carbons and is alkyl, aryl, alkenyl or haloalkyl;
$R_2$ is hydrogen, halogen, and 1 to about 6 carbons containing alkyl, aryl or alkenyl;
X is hydrogen or halogen;
n is 0, 1 or 2;
o is 1 or 2;
p is 0 or 1; and
m is $11-(o+n+p)$.

The complexes are highly stable, crystalline solids that can be obtained as electro neutral complexes which are soluble in non-polar solvents. The complexes, by variation in the carbollyl group or by variation in the oxidation state of the noble metal can also be obtained as anions which form salts with ammonium and alkali metals that are soluble in polar solvents. The empirical formula for the salt form is:

$$Z_a(M[(BX)_m(BR_1)_n(CR_2)_o(BY)_p]_2)$$

wherein: Z is an alkali metal, ammonium or $C_1$-$C_5$ alkylammonium, and the remainder of the terms are as aforedescribed.

The complexes are useful as catalysts for chemical conversions, e.g., for the oxidation of olefins to carbonyls such as aldehydes, ketones and acids; to esters of $\alpha,\beta$-ethylenically unsaturated alcohols, to acetals, etc. by contacting the olefin with an aqueous, alcoholic or carboxylic acidic solution containing the complex at temperatures from 30° to 300° C.

DESCRIPTION OF THE INVENTION

The invention comprises bis-carbollyl Group VIII noble metal complexes which can be prepared by reacting an excess quantity of a carbollide with a soluble complex of the noble metal.

The carbollide is a carbon and boron-containing ligand having the shape of an icosahedron with one missing apex. Its empirical formula is:

wherein the values and definitions of the terms are as previously described.

The figures illustrate the carbollides and the metal complexes as follows.

Figure 1:
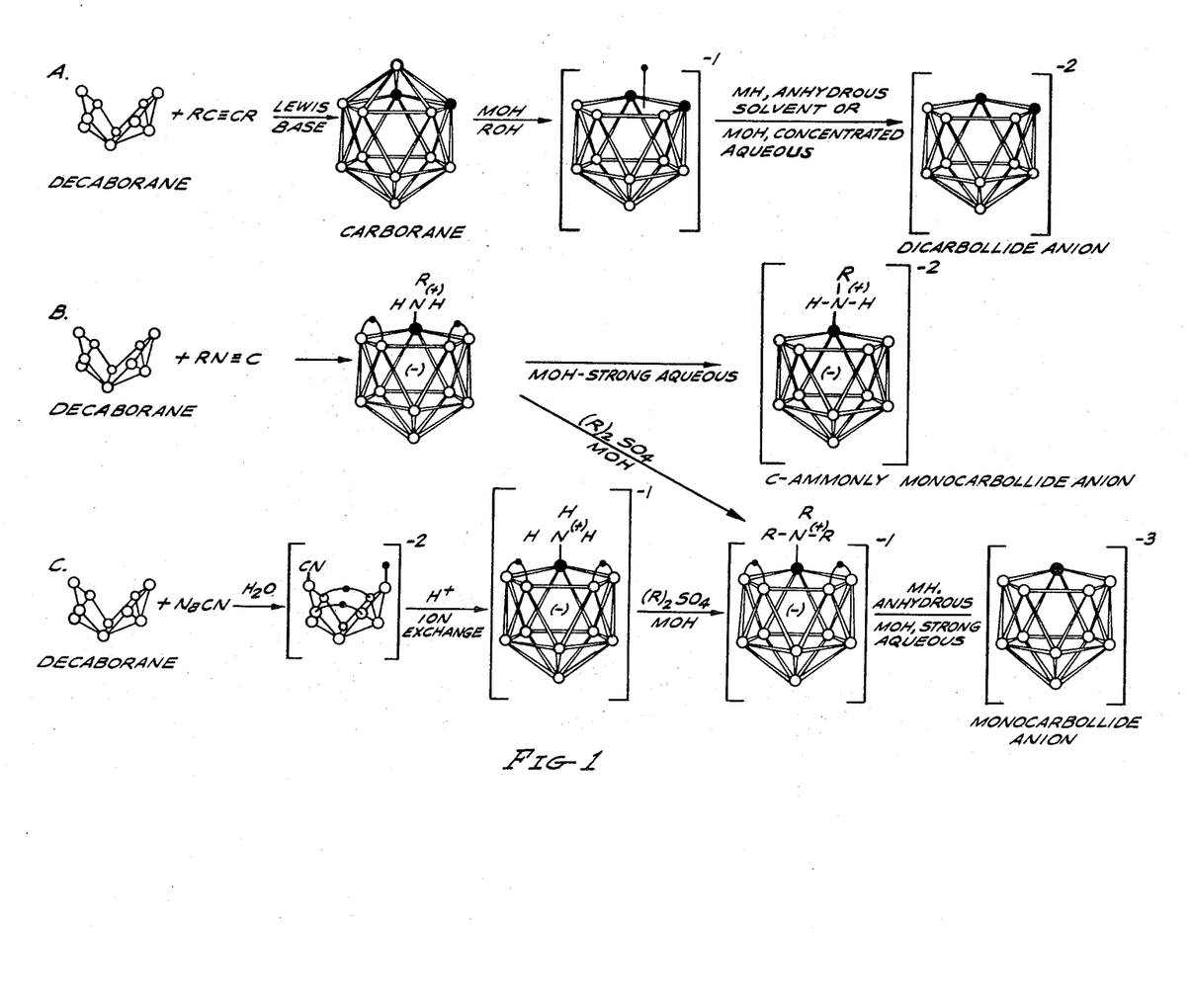
FIG. 1 illustrates the preparation of various carbollides.

Referring now to FIG. 1, three methods for preparation of carbollide anions are shown. In this diagram, the boron atoms are unshaded and the carbon atoms are shaded. The small shaded spheres represent significant hydrogen atoms while the terminal substituents X, Y, R or R', one of which is attached to each boron or carbon atom, have been omitted from this drawing where these substituents do not significantly affect the preparation of the anions.

The carbollides are prepared from decaborane or alkyl substituted decaborane by either of three preparations which are described in greater detail hereinafter and which are illustrated in the examples.

In preparation A, decaborane is reacted with an acetylene to produce carbonane which is degraded with alcoholic base to abstract a boron atom. Treatment of the resultant material with an alkali metal hydride in an anhydrous solvent or treatment with concentrated aqueous base removes the protonic hydrogen which is associated with the open face of the intermediate and thereby forms the dicarbollide anion.

In preparation B, decarborane is reacted with an alkyl or aryl isocyanide which forms a compound having the structure of a truncated icosahedron with an ammonium group on the carbon atom and bridging hydrogen atoms on the two pairs of face boron atoms. Treatment of this compound with strong aqueous base removes the two bridging hydrogens and yields a C-ammonyl monocarbollide anion.

Preparation C reacts an alkali metal cyanide with decaborane to form a divalent cyanoborane anion. This material is passed over an acidic ion exchange solid to close the structure and form a carborate anion which is a homolog of the intermediate of preparation B. This material is then N-alkylated by treatment with a dialkyl sulfate in an alkali metal hydroxide solution. The intermediate of preparation C can similarly be N-alkylated. The fully N-alkylated material can then be treated with an alkali metal hydride in anhydrous solution or with concentrated aqueous alkali metal hydroxide to abstract the trialkyl ammonium group and the two bridging hydrogens from the face of the truncated icosahedron thereby forming a monocarbollide ion. The monocarbollide and dicarbollide anions prepared in methods A, B and C are iso electronic.

Figure 2:
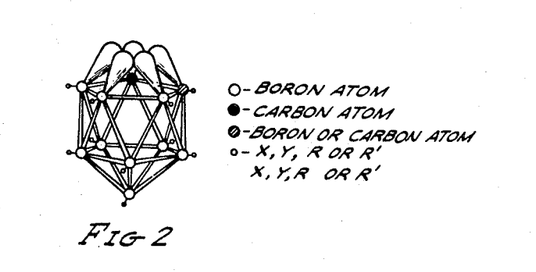
FIG. 2 illustrates the orbitals of the carbollides that are available for metal complex formation.

FIG. 2 illustrates the vacant $sp^3$ orbital lobes on the open face of the truncated icosahedron structure of the carbollide anion. Each atom in the anion has a terminal substituent such as X, Y, R or R' previously mentioned. The ion is described as the (3)-1,2-dicarbollide anion wherein the number in parenthesis refers to the missing boron atom and the 1,2 numbers indicate the positions of the carbon atoms in the icosahedral cage. The corresponding monocarbollide is identified as (3)-1-monocarbollide anion. Isomers of the dicarbollide structure are possible and can be prepared in the manner hereinafter described wherein the carbon atoms occupy other positions in the cage, i.e., the (3)-1,7-dicarbollide and the (3)-1,12-dicarbollide anion.

Figure 3:
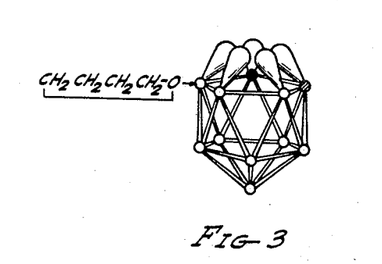
FIG. 3 illustrates a boron-ligand substituted carbollide.

FIG. 3 illustrates the B-ligand-carbollide structure wherein a ligand such as tetrahydrofuran is substituted on a boron atom. This ligand can be substituted on either of the three boron atoms in the face of the truncated icosahedron and symmetrical and asymmetrical isomers are thereby provided. Two ligand isomers occur with the (3)-1,2-dicarbollide ion. These are *symmetric* 8-ligand-(3)-1,2-dicarbollide and *asymmetric* 4-ligand-(3)-1,2-dicarbollide. Both ligand substituted monocarbollide isomers are asymmetric.

Group VIII noble metals are capable of forming π molecular orbitals with the five $sp^3$ orbital lobes shown on the face of the truncated icosahedron of FIGS. 2 and 3 and these metals will therefore complex with the carbollide ions. The metals form a set of three bonding molecular orbitals containing a total of six electrons all of which are provided by the metal atom. Bis-π-complexes are formed as are illustrated in FIG. 3 wherein two of the carbollyl truncated icosahedrons are complexed with a single metal atom designated as M. The net valency of this complex is indicated as $a+b+c$ wherein $b$ is the previously mentioned valence for the carbollide designated as I and $c$ is the valence for carbollide II and $a$ is the formal oxidation state of the metal.

Figure 4:
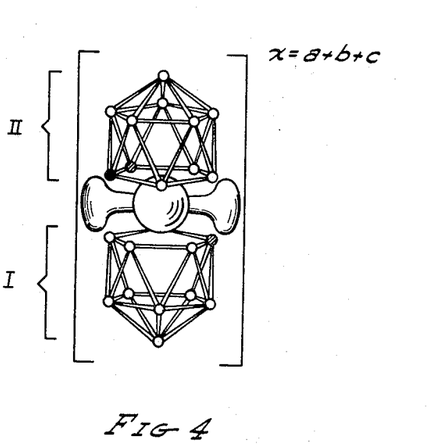
FIG. 4 illustrates a bis-π-carbollyl metal complex.

In FIG. 4, the metal atom is shown surrounded with a $h_{ag}$ molecular orbital. The calculation of this orbital is similar to the Moffit molecular orbital treatment of ferrocene.

CARBOLLIDE PREPARATION AND DICARBOLLIDE PREPARATION

The dicarbollides used in this invention to prepare dicarbollyl metal complexes are derived from dicarborane ($B_{10}H_{10}C_2H_2$) which in turn is derived from decaborane (14). The preparation is illustrated in FIG. 1, method A. In the preparation of dicarborane, decaborane is purified by sublimation or recrystallization and dissolved in an organic solvent such as an ether. A Lewis base such as diethyl sulfide, acetonitrile, etc., is added to this solution and the solution is maintained at about 25°–85° C. for an extended period while acetylene is passed into contact with the solution. The reaction is as follows:

$$B_{10}H_{14} + 2(C_2H_5)_2S \rightarrow B_{10}H_{12}[S(C_2H_5)_2]_2 + H_2$$

$$B_{10}H_{12}[S(C_2H_5)_2]_2 + RC \equiv CR \rightarrow B_{10}H_{10}(CR)_2 + 2(C_2H_5)_2S + H_2$$

The reaction mixture is evaporated under vacuum to remove the Lewis base, e.g., diethyl sulfide, and the solvent. The product is dissolved in an inert solvent and reacted with concentrated hydrochloric acid to convert byproducts to hydrogen and borates. The crude dicarborane is recovered from the solvent by cooling and separating it as a solid. The solid product is washed with aqueous potassium hydroxide, filtered and dried. The dried solid is then extracted with a hydrocarbon solvent and purified dicarborane is crystallized as a solid from the hydrocarbon.

The product from the acetylene addition is 1,2-dicarbaclovododecaborane. Heating of this product neat or in an inert solvent to a temperature of about 500° C. will isomerize the 1,2-dicarborane to the 1,7-dicarborane isomer in substantially total yield. Heating of the 1,7-isomer to about 600° C. will cause further rearrangement to the 1,12-dicarborane.

The dicarborane can be obtained with various substituents on the carbon atoms by the use of appropriately substituted acetylene. Thus bromomethyl dicarborane can be obtained by the use of propargyl bromide rather than acetylene in the aforedescribed preparation. Use of phenyl acetylene likewise provides phenyl dicarborane. In general, any substituted acetylene can be used in the preparation of the dicarboranes and thereby obtain a dicarborane having the same substituent on its carbon atom or atoms. Examples of suitable acetylenic reactants include amyl acetylene, amylmethyl acetylene, butyl acetylene, butylethyl acetylene, butymethyl acetylene, chloro acetylene, decylmethyl acetylene, di-n-amyl actylene, di-bromo acetylene, dibutyl acetylene, diiodo acetylene, diethyl acetylene, dimethyl acetylene, diphenyl acetylene, dipropyl acetylene, divinyl acetylene, ethyl acetylene, ethylpropyl acetylene, n - heptyl acetylene, isopropyl acetylene, methylphenyl acetylene, n-propyl acetylene, vinyl acetylene, etc. These carbon substituted dicarboranes can be thermally isomerized to the 1,7- and 1,12-dicarboranes in the same fashion described in regard to the unsubstituted dicarborane.

The dicarbollide ion can be prepared in two steps from the 1,2- or the 1,7-dicarborane which can have hydrogen or any of the aforementioned substituents on the cage carbon atoms. In the first step a monovalent dicarbadodecahydroundecaborate anion is obtained by degradation of dicarborane with alcoholic base, e.g., alcoholic solution of potassium hydroxide, sodium hydroxide or piperidine. This is illustrated in FIG. 1 as the second step in method A. In this preparation, the dicarborane is dissolved in a suitable alcohol, e.g., methanol, ethanol, isopropanol, butanol, etc., which contains a strong alkali such as an alkali metal hydroxide or piperidine. The reaction is performed at ambient to reflux temperatures at atmospheric or superatmospheric pressure. The strong base abstracts a boron atom from the carborane which forms a borate ester with the alcohol and evolves hydrogen from the reaction mixture, as follows, with potassium hydroxide in methanol:

$$B_{10}H_{10}(CR)_2 + KOCH_3 + 2CH_3OH \rightarrow KB_9H_{10}(CR)_2 + B(OCH_3)_3 + H_2$$

After hydrogen ceases to be evolved, the reaction mixture is cooled and the alkali metal dicarbadodecahydroundecaborate can be purified by precipitation of the excess alkali as the carbonate by saturating the solution with carbon dioxide, filtration, and evaporating the filtrate to dryness to recover the alkali dicarbadodecahydroundecaborate. The resultant salt can be converted to the salt of other cations by base exchange reactions to thereby obtain the ammonium salts or organic ammonium salts.

The monovalent dicarbadodecahydroundecaborate ion can be converted to the divalent dicarbollide anion by treatment to abstract a protonic hydrogen which is associated with the face of the truncated icosahedral dicarbadodecahydroundecaborate ion. This treatment is illustrated in the last step of method A, FIG. 1. The treatment to abstract this protonic hydrogen involves treatment of the dicarbadodecahydroundecaborate ion with an alkali metal, alkali metal hydride or concentrated alkali metal hydroxide. The reaction can be performed in an inert solvent, e.g., tetrahydrofuran, or can be performed with concentrated (at least about 50 weight percent) aqueous alkali metal hydroxide. When the reaction is performed in the inert solvent, the divalent dicarbollide ion or salt thereof can be obtained. The reaction in an aqueous base, however, is performed in the presence of a complex of a transition metal, hereinafter described, and the product is the carbollyl metal complex.

The preparation in an inert solvent is herein described; however, both preparations are illustrated in the examples. Sodium hydride can conveniently be used as a 50 percent dispersion in tetrahydrofuran. The alkali metal salt of the dicarbadodecahydroundecaborate ion is added to the dispersion and the temperature is raised to reflux temperature at which point hydrogen is evolved. The resultant dicarbollide anion precipitates as the alkali metal dicarbollide and can be recovered from the solvent by filtration. The precipitate can be purified by extraction with a hydrocarbon to obtain a residue comprising the purified alkali metal dicarbollide.

The alkali metal salt can be obtained as the salt of other cations by base exchange reactions in non-protonic solvents with such cations, e.g., ammonium chloride, tetramethyl ammonium chloride, other alkali metal salts such as cesium or rubidium chloride, etc. This dicarbollide anion is employed to form dicarbollyl metal complexes which serve as catalysts in my invention.

MONOCARBOLLIDE PREPARATION

The monocarbollide anion used in this invention to prepare carbollyl metal complexes is prepared from an alkylammonium carborane having the general formula $B_{10}H_{12}CNR'_2R$ wherein R' is hydrogen or alkyl and R is alkyl such as methyl, ethyl, propyl and butyl, etc. The alkylammonium carborane is prepared from decaborane according to either method B or method C illustrated in FIG. 1. In method B, decaborane is reacted with an isocyanide of the aforementioned alkyl groups. The reaction is as follows:

$$B_{10}H_{14}+RNC \rightarrow RNH_2CB_{10}H_{12}$$

This reaction is performed at ambient temperature and results in the insertion of a carbon atom in the boron structure to yield a truncated icosahedron unit with a carbon atom in the open face having an alkyl ammonium group dependent thereon and hydrogen atoms bridging the two pairs of boron atoms in the open face of the icosahedron.

The alkylammonium carborane is converted to the monocarbollide anion in the second step of method B by treatment with concentrated (at least about 50 weight percent) aqueous alkali metal hydroxide. This treatment can also be performed in the presence of a complex of a transition metal to prepare directly the carbollyl metal complex. The treatment with the strong base results in abstraction of the bridge hydrogens on the face boron atoms and converts the ammonium carborane into a divalent C-ammonyl monocarbollide anion which can complex with transition metals. This complex can be used as the catalyst in my invention or, if desired, the carbon atom can be substituted with various groups by using the Grignard reaction herinafter described. At least one of the boron atoms of the icosahedron base can also be substituted with a ligand by carrying out the oxidative substitution reaction also hereinafter described.

The monocarbollide anion can be obtained with a hydrogen rather than an ammonium group on the face carbon. This is achieved by fully N-alkylating the ammonium carborane with an alkyl sulfate in a strong base. This treatment is shown on FIG. 1 by the arrow that extends to the fully N-alkylated ammonium carborane shown in method C. Treatment of this material with an alkali metal hydride in anhydrous solvent, e.g., tetrahydrofuran, or with concentrated (at least 50 weight percent) aqueous alkali metal hydroxide abstracts the bridging hydrogen atoms and also abstracts the ammonium group, thereby forming the trivalent monocarbollide anion.

An alternate preparation of the N-alkylated ammonyl carborane is shown in method C. In this method, an alkali metal cyanide is reacted with decaborane in aqueous solution as follows:

$$B_{10}H_{14}+2NaCH \rightarrow Na_2B_{10}H_{13}CN+HCN$$

The aqueous solution of the cyanoborane is passed over an ion exchange solid which causes rearrangement of the anion to the neutral C-ammonyl carborane which is recovered by evaporation of the column effluent to dryness. The C-ammonyl carborane can be purified from boric acid, also formed during the column treatment, by extraction into an ether solvent. This material can then be fully N-alkylated by treatment with an alkyl sulfate in an aqueous alkaline solution, e.g., ten percent aqueous sodium hydroxide, to provide the last intermediate to the trivalent monocarbollide anion.

CARBON SUBSTITUTED CARBOLLIDE PREPARATION

As previously mentioned, the carbollides can be obtained wherein various substituents are bonded to the boron and the carbon atoms of the carbollyl cage. These derivatives are attached to the cage atoms by two center bonds. For the simplest case the groups on the cage atoms are terminally bonded hydrogen. The carbon atoms, however, can be substituted with a plurality of groups such as alkyl, e.g., methyl, propyl, isopropyl, ethyl, butyl, amyl, dodecyl, hexadecyl, etc.; aryl and alkaryl, e.g., phenyl, tolyl, xylyl, naphthyl, cumenyl, ethylphenyl, etc.; alkenyl, e.g., propenyl, amyl, butenyl, etc.; halo, e.g., iodo, bromo, chloro, fluoro, carboxyl, e.g., carboxymethyl, carboxyethyl, carboxypropenyl, etc.

The aforementioned substituents can be formed on one or both of the carbons of the dicarborane used as the dicarbollyl precursor by use of the appropriately substituted acetylene in the synthesis of the dicarborane from decarborane as previously mentioned. The use of some substituted acetylenes and the identification of the resultant 1 and 1,2-substituted carboranes appears in Inorganic Chemistry, vol. 2, No. 6, pp. 1115–1119. The synthesis comprise reaction of the substituted acetylene with decaborane in an inert solvent and in the presence of a Lewis base such as acetonitrile or diethyl sulfide. Using the appropriately substituted acetylene, the syntheses of the following carboranes is reported: 1-ethyl carborane, 1 - propylcarborane, 1 - hexylcarborane, vinylcarborane, 1-phenylcarborane, 1-beta-bromoethylcarborane, 1-chloromethylcarborane, 1 - beta - chloroethylcarborane, 1-Ω-chloropropylcarborane, 1-carboranylmethyl acetate, 1-carboranylmethyl acrylate, 1-carboranylglycol diacetate, 1 - carboranylethylidene dipropionate, 1-methyl-2-carboranylethylidene dipropionate, 1,2-bis(alpha-methylvinyl) carborane, 1,2 - bis(chloromethyl)carborane, 1,2 - bis(carbomethoxy) carborane, 1 - methyl - 2 - bromomethylcarborane, 1,2-diisopropylcarborane, 1,2-bis-(hydroxymethyl))carborane, 1-hydroxymethyl - 2 - (γ-hydroxy-α-propynyl)-carborane, diethyl-2,2-bis-(1 - carboramylmethyl) malonate and 1-bromomethyl-2-methylcarborane.

CARBON SUBSTITUTED DERIVATIVES

The hydrogen bonded to the carbon of the mono- or di-carborane or of the mono- or di-carbollide cage exhibits the similar reactivity as the hydrogen on acetylene and accordingly a cage carbon atom can also be substituted by any of the reactions employed for substitution on acetylene. Thus, the carborane can be alkylated by reaction with an alkyl halide in the presence of a Lewis acid such as aluminum or ferric bromide or chloride; see U.S. Pat. 2,999,117; to substitute the cage carbon atoms with an alkyl or aryl group.

The cage carbons can also be substituted with a variety of groups by the Grignard reaction. In this reaction, the 1- or 1,2-halo substituted carborane or carbollide is reacted in an inert solvent, e.g., ethyl ether, with magnesium to form a Grignard reagent which readily undergoes standard Grignard reactions to substitute the cage carbons. This reaction is described in the aforecited publication and in Inorganic Chemistry, vol. 2, No. 6, pp. 1115–1125 (December 1963). The carboranyl Grignard reagent, e.g., 1-carboranylmethylmagnesium bromide can be reacted with: (1) alkyl or alkenyl ketones or aldehydes to prepare secondary and tertiary carboranyl alcohols, (2) formaldehyde to prepare a primary carboranyl alcohol, or (3) alkyl, aryl or alkenyl halides to prepare alkyl, aryl or alkenyl halides to prepare alkyl, aryl or alkenyl substituted carboranes, (4) acetals to prepare alkyl carboranyl ethers, or (5) nitriles to prepare carbonyl ketones.

Examples of reactants which can be used are: formaldehyde, acetaldehyde, propionaldehyde, butyraldehyde, isobutyraldehyde, methylethyl ketone, diisopropyl ketone, benzaldehyde, crotonaldehyde, acrolein, etc.; ethyl chloride, methyl bromide, allyl bromide, chlorobenzene, amyl fluoride, chloronaphthalene, etc.; 1,1-dimethoxy ethane, 1,1-diisopropoxy butane, 1,1-diethoxy hexane, etc.; acetonitrile, acrylonitrile, benzonitrile, crotonitrile, valeronitrile, methacrylonitrile, butyronitrile, isobutyronitrile, capronitrile, etc. The choice of solvent can also influence the product obtained from the Grignard reaction, e.g., it has been reported that when allyl bromide was reacted with the Grignard reagent, 1-carboranylmethylmagnesium bromide, the normal reaction yields 4-(1-carboranyl)-1-butene; however, with tetrahydrofuran as the solvent, 1-allyl-2-methylcarborane is obtained.

The carborane can also be reacted with alkyl and aryl-lithium reagents, e.g., butyl or phenyl lithium, at temperatures from 0° to 30° C. to provide the 1-lithium and 1,2-dilithium carboranes which can then be reacted to produce carboranyl acids, carbinols and halides. To illustrate, the contacting of dilithium dicarborane with carbon dioxide at temperatures from 0° to 25° C. forms the lithium salt of 1,2-carboranedicarboxylic acid from which the acid can be formed by acidification. Contacting the lithium carborane with an alkylene oxide, e.g., ethylene oxide, yields the hydroxyalkyl derivative, e.g., 1,2-bis-(hydroxyethyl)-carborane. The carboranediformyl halides can be obtained by reaction of the lithium salt of 1,2-carboranedicarboxylic acid with excess oxalyl chloride. The resultant acid chloride can then be reacted with alkyl, cycloalkyl and alkenyl alcohols to form esters of the 1,2-carboranedicarboxylic acid. The disubstituted carboranes have also been found to exhibit a strong tendency to form 1,2-exocyclic derivatives. Treatment of the bis-(hydroxy)-carboranes with an acid such as concentrated sulfuric at temperatures from 100° to 175° C. forms cyclic ethers. Upon heating to about 250°–300° C. the bis(2-carboxy-1-carboranylmethyl) ether form 2 moles of a carboranyl lactone, $B_{10}H_{10}CCH_2OC(O)C$; and the 1,2-dicarboranedicarboxylic acid form a cyclic anhydride by contacting with dehydrating agents such as thionyl chloride in the presence of sodium carbonate.

BORON SUBSTITUTED DERIVATIVES

The hydrogen bonded to the boron of the icosahedral cage is also bonded with a two-center bond and these hydrogen atoms can be replaced with various substituents. Simple halogenation of the carborane or carbollide anions will first halogenate the boron atoms to provide carbollides containing up to 10 bromo, fluoro, chloro or iodo atoms. A description of the halogenation as applied to chlorination of dicarborane appears in Inorganic Chemistry, vol. 2, No. 6, pp. 1092–1096 (December 1963). A similar halogenation technique can be applied to the monocarborane to produce its halogenated derivatives. This reaction comprises contacting the carborane in an inert solvent with gaseous halogen, e.g., chlorine. The boron atoms are halogenated first before halogenation of the carbon atom or atoms. The degree of halogenation can be controlled by limiting halogen concentration or the solvent, e.g., carbon tetrachloride, to precipitate the halogenated carboranes as the di, tri, tetra, hexa, octa, deca and undeca-halocarborane.

The carbollide can also be obtained having one or two of the cage boron atoms in the upper plane, i.e., atoms 4, 8 and 7 of the dicarbollide or atoms 4, 8, 7 of the monocarbollide substituted with an alkyl, aryl, alkaryl, aralkyl, alkenyl, aralkenyl, etc. group. A procedure that can be used to prepare the boron substituted derivatives comprises reforming the carborane from the carbollide anion using an organic boron halide. The resultant boron substituted carborane can then be treated with strong base or alkali metal hydride to abstract a boron atom from the cage and form a boron substituted carbollide. This procedure can be repeated to prepare a di-substituted carbollide having two of the open face borons substituted with an organic group. This procedures is illustrated in the examples and briefly comprises reaction of a soluble salt, e.g., alkali metal salt of the carbollide anion with an organic substituted boron halide. This reaction is performed at ambient conditions of temperature and pressure and proceeds as follows:

$RBCl_2 + Ha_2(B_9C_2H_{11}) \rightarrow B_9C_2H_{11}Br + 2NaCl$
$RBCl_2 + Na_3(B_{10}CH_{11}) \rightarrow Na(B_{10}CH_{11}BR) + 2NaCl$ wherein R contains from 1 to about 12 carbons and is alkyl, alkenyl, aryl and halo, carboxy or sulfo derivatives thereof.

Examples of suitable R groups are methyl, carboxymethyl, chloromethyl, ethyl, isopropyl, amyl, butyl, 2-ethylhexyl, phenyl, p-bromophenyl, xylyl, tolyl, naphthyl, dichlorophenyl, vinyl, allyl, butenyl, etc. The resultant boron substituted carborane can then be reacted in the manner previously described to abstract a boron hydride from the icosahedron structure and thereby form a B-substituted carbadodecahydroundecaborate ion with the organic substituent on a boron atom in the open face of the truncated icosahedron. Repeated insertion of a like or differently substituted boron atom provides a route to B,B'-disubstituted carbollide ions.

As previously mentioned, one of the boron atoms in the face of the truncated icosahedron carbollide ion can also be substituted with a suitable ligand. Any of the ligands described hereinafter under "Ligands" can be employed for this substitution which is an oxidative substitution performed by reacting a salt of the carbollide ion or the carbadodecahydroundecaborate ion with an oxidizing agent such as ferric chloride, cupric chloride, etc., in the presence of the ligand. This treatment results in oxidation of a hydrogen of a boron atom in the face of the truncated icosahedral cage with reduction of the ferric or cupric chloride to ferrous or cuprous chloride and substitution of the ligand on a boron atom. The reaction illustrated with potassium carbadodecahydroundecaborates is as follows:

The substitution occurs on the boron atoms in the face of the truncated icosahedral carbollide ion. Two isomers are formed from the dicarbahomolog and these isomers are symmetrical or asymmetrical depending on the location of the substituted boron atom on the face of the truncated icosahedron. Both isomers of the monocarba homolog are asymmetric. This substittuion can be performed with any of the ligands mentioned in the section hereinafter entitled "Ligands." The following is a listing of some of the carbollide ions which can be formed in this manner:

8-tetrahydrafuran-(3)-1,2-dicarbollide;
4-tetrahydrafuran-1,2-dimethyl-1,2-dicarbollide;
8-pyridine(3)-1,2-dicarbollide;
8-tetrahydrafuran-(3)-1-monocarbollide;
4-pyridine(3)-1-methyl-1-monocarbollide;
7-diethylsulfide-(3)-1,2-dimethyl-1,2-dicarbollide;
4-triphenylphosphine-(3)-1,2-dicarbollide;
4-methylcyanide-(3)-1-phenyl, 1,2-dicarbollide; etc.

LIGANDS

Ligands as defined herein for substitution on a boron atom of the carbollide ion by use in the oxidative substitution reaction previously mentioned comprise electron contributing reactants which have at least one atom with an unshared electron pair which is available for coordinate covalent or multicenter bonding. Examples of ligands include the halogens and compounds of nitrogen, oxygen, sulfur, arsenic, antimony, bismuth and phosphorus wherein the indicated element has a valence pair of unshared electrons. The reactants can contain only one of these atoms per molecule (monodentate); two atoms (bidentate); or a plurality of centers (polydentate).

Examples of ligands include:
(1) Halides, e.g., chloro, bromo, fluoro and iodo;
(2) Oxygen compounds, e.g., water, carbon monoxide; alkyl, aryl and alicyclic hydroxy compounds having from 1 to about 10 carbons such as alkoxys, e.g., methoxy, ethoxy, isopropoxy, butoxy, phenoxy, naphthoxy, cyclohexoxy, hexoxy, etc.; alkyl carbonyl or carboxyl compounds such as acetyl acetonate; aliphatic beta-iminoketones, e.g., 1 - methyl - 3-iminopropanone, 3-isopropyl-3-iminopropanone, 1,3-diethyl-3-iminopropanone, 3-isoamyl-3 - iminopropanone, etc.; aliphatic hydroxy ketones and hydroxy aldehydes such as 2-hydroxy-5-acetyl acetophenone, 2-hydroxy-4-butyl benzaldehyde, etc.; alkyl and aryl peroxides, e.g., benzoyl peroxide, ethyl methyl peroxide, acetyl benzoyl peroxide, etc.; hydroxymonobasic, hydroxydibasic and dibasic aliphatic acids, ammonium and alkali metal salts and alkanol esters thereof such as glycolic acid, lactic acid, betahydroxy butyric acid, alphahydroxy butyric acid, glyceric acid, gluconic acid, maleic acid, oxalic acid, tartaric acid, citric acid, etc.; heterocyclic oxy compounds having from 3 to about 7 members in the heterocyclic ring and including the following parent compounds, the ring position isomers thereof and the alkylated derivatives thereof wherein from 1 to all the ring carbons are substituted with an alkyl or alkenyl group containing up to about 6 carbons, e.g., ethylene oxide, propylene oxide, styrene oxide, 2,3-epoxybutane, trimethylene oxide, 1,3 - epoxyheptane, furans, tetrahydrofurans, pyrans, tetrahydropyrans, pyrones, dioxins, oxathioles, ixoxazoles, oxazoles, oxadizoles, oxepins, oxazines, benzopyrans, benzopyrones, benzofurans, benzoisofurans;

(3) Nitrogen compounds such as nitric oxide, ammonia, alkyl and aryl amines having from 1 to about 10 carbons such as methylamine, diethylamine, isopropyl amine, trimethylamine, amylamine, butyl amine, cyanogen, hydrogen cyanide and aliphatic or aryl nitriles having from 1 to about 6 carbons, e.g., acetonitrile, propionitrile, isobutyronitrile, acrylonitrile, adiponitrile, benzonitrile, terephthelonitrile, etc.; alkyl, cycloalkyl and aryl isocyanates having from 1 to about 10 carbons such as ethyl isocyanate, isobutyl isocyanate, phenyl isocyanate, cyclohexyl isocyanate, etc.; alkylenediamines, N-alkyl-alkylenediamines, N,N'-alkylalkylenediamines and alkylenediaminecarboxylic acids having from 1 to about 10 carbons and their salts such as ethylenediamine, N-methylethylenediamine, N-ethyl-ethylenediamine, N,N'-di-methylethylenediamine, propylenediamine, 3-dimethyl-2,3-diaminobutane, trimethylenediamine, 2-hydroxy-1,3-diaminopropane, tetramethylenediamine, pentamethylenediamine, ethylenediamine-N,N'-diacetic acid, N-hydroxyethylethylenediaminetriacetic acid, ethylenediaminotetraacetic acid, etc.; heterocyclic nitrogen compounds having from 3 to 7 membered rings containing up to 3 or 4 hetero-atoms at least one of which is nitrogen including the parent compounds listed below, and their ring position isomers, e.g., ethylene imine, trimethylene imine, pyrroles, isopyrroles, pyrazoles, triazoles, oxatriazoles, pyridines, pyridazines, pyrazines, piperazine, triazines, morpholine, azepine, indole, pyrindine, quinoline, isoquinoline, etc.; polyheterocyclic amines having at least one nitrogen in a bridgehead position such as 1,2,4-triazabicyclo(1.1.1)pentane, 5 - thia-1,6-diazabicyclo(2.1.1) hexane, 1,4 - diazabicyclo(2.2.2)octane (triethylene diamine), 1,3,5,7 - tetrabicyclo(3.3.1) - nonene (pentamethylenetetramine), 1,3,5,7 - tetrazatricyclo(3.3.1)decane (hexamethylenetetramine), etc.

(4) Sulfur compounds such as sulfur dioxide, carbon disulfide, and aliphatic mercaptans and sulfides having from 1 to about 10 carbons such as methyl mercaptan, dodecyl mercaptan, dimethyl uslfide, diethyl sulfide, diisopropyl sulfide, dibutenyl sulfide, diamyl sulfide, ethyldecyl sulfide, methyldodecyl sulfide, etc.; heterocyclic sulfides having from 3 to 7 membered rings containing up to about 3 hetero-atoms at least one of which is sulfur and including the parent compounds listed below and their ring position isomers, e.g., ethylene eposulfide, thiophenes, tetrahydrothiophenes, thiobiazolones, thiobiazolines, thiodiazoles, thiodiazolidines, azosulfines, piazothioles, thiobiazolines, thionessals, thiochroman, bithiophenes, thiopins, thionaphthenes, isothionaphthenes, oxathioazines, etc.;

(5) Organic compounds having from 3 to about 18 carbons and containing at least one trivalent atom of phosphorus, bismuth, arsenic or antimony having an unshared pair of valence electrons. These compounds can be described by reference to empirical formulae as follows:

$$ER_3 \text{ or } (R)_2ER'E(R)_2$$

wherein: E is a trivalent phosphorus, bismuth, arsenic or antimony atom; R is hydrogen, alkyl and cycloalkyl from 1 to about 8 carbon atoms, aryl from 6 to about 8 carbons or the halo, amino and alkoxy derivatives thereof; and R' is alkylene from 1 to about 8 carbons.

Examples of suitable ligands of the preceding formulae include: trimethyl phosphine, triethyl arsine, triisopropyl stibine, diethylchloro phosphine, triaminobutyl arsine, ethyldiisopropyl stibine, tricyclohexyl phosphine, triphenyl phosphine, triphenyl bismuthine, tri(o-tolyl)phosphine, phenyldiisopropyl phosphine, phenyldiamyl phosphine, diphenylethyl phosphine, chlorodixylyl phosphine, chlorodiphenyl phosphine, tris(dimethylaminoethyl) phosphine, ethylene-bis-(diphenyl phosphine), hexamethylene-bis-(diisopropyl arsine), pentamethylene-bis-(diethyl stibine), etc.

The noble metal can be complexed with a carbollide anion by incorporating a soluble complex of the noble metal in a non-protonic solvent and then contacting the complex with an excess amount of a soluble carbollide salt or solution thereof. Salts of the noble metals are not useful in this preparation because of their limited solubility and because the noble metal cations are sufficiently strong oxidizing agents to oxidize the carbollides and form pyrophoric mixtures with the carbollides.

The noble metals which can be used are the Group VIII noble metals including those of the third transition series, i.e., platinum, iridium and rhodium, and the second transition series comprising palladium, ruthenium and osmium.

A soluble complex of the noble metal is reacted with the carbollide and the noble metal can be zero valent or divalent in the complex. Examples of suitable ligands for complexing with the noble metals include conjugated alkandiones, e.g., 2,4-pentadione, 2,4-heptadione, 4,6-octadione, etc.; beta-iminoalkanones, e.g., 1-ethyl 3-iminopropanone, 1 - isopropyl 3 - iminopropanone; 1,3 - dibutyl 3-iminopropanone, beta-iminopentanone, etc.; and ligands of phosphorus, bismuth, arsenic or antimony having the following structure:

$$R_3E \text{ and } R_2ER'ER''_2$$

wherein: E is a trivalent phosphorus, bismuth, arsenic or antimony atom; R and R'' are hydrogen, alkyl and cycloalkyl from 1 to about 8 carbon atoms, aryl and from 6 to about 8 carbon atoms or the halo, amino and alkoxy derivatives thereof; R' is alkylene from 1 to about 8 carbons.

Examples of suitable complexes include: ruthenium(II) acetylacetonate, osmium(II)acetylacetonate, palladium (II)acetylacetonate, rhodium(II)beta-iminopentanonate, iridium acetylacetonate, tris(triphenylphosphine) rhodium (II)chloride, bis(tri - n - butylphospine)rhodium(II)chloride, tetrakis(triphenylphosphine)palladium(O), tetrakis (triethylphosphine)platinum(O), bis(triethylphosphine) hydrido chloro platinum(O), bis(triethylphosphine)hydrido chloro palladium(O), bis(triethylarsine)rhodium (III)nitrate, etc.

The ligand of the noble metal complex is displaced from bonding with the noble metal by the carbollide and the biscarbollyl metal complexes are thereby formed.

COMPLEX PREPARATION

The metal complex can be formed by admixture of a solution of the carbollide ion formed as previously mentioned, with a solution of ligand complex of the particular metal. I have found that the carbollyl complex is not formed when the carbollide and noble metal source are admixed in stoichiometric quantities, i.e., molar ratio of carbollide to metal complex about 2:1 but instead this procedure results in formation of noble metal precipitate. To obtain the carbollyl-noble metal complex it is necessary to employ an excess of the carbollide and I have found that molar ratios from 3:1 to about 20:1; preferably from 5:1 to 10:1, carbollide to metal, can be used to prepare the carbollyl metal complex without noble metal precipitation.

A carbollyl metal complex can be prepared by simply admixing a soluble complex of the metal with a soluble form of the carbollide anion in an inert solvent. A suitable inert solvent that can be used in the preparation is tetrahydrofuran. Other solvents include any of the solvents hereinafter described under the section entitled "Solvents." To this solvent can be added a soluble salt, e.g., ferrous chloride and a soluble salt of the carbollide anion such as sodium carbollide is thereafter added. Preferably the carbollide solution is prepared in tetrahydrofuran and thereafter added to a tetrahydrofuran solution of the indicated metal salt. The resultant carbollyl metal complex can be crystallized by evaporation of the solvent to obtain a crystalline residue. When the carbollyl metal complex is an anion and is present as an alkali metal salt it can be dissolved in water and purified by filtration through a suitable adsorbent, e.g., diatomaceous earth. The carbollyl metal complex can be recovered from the aqueous solution by a precipitation with a suitable base exchange material, e.g., an aqueous solution of a tetramethyl ammonium salt.

Examples of carbonyl metal complexes which can be formed by the preparation disclosed herein are listed in the following table. For simplicity, when the complex has a net negative charge, the cation associated with the complex ion is not included. Examples of such are the alkali metal, ammonium, organic ammonium cations, e.g., sodium, lithium, potassium, ammonium, tetramethylammonium, etc. Examples of anions associated with cationic complexes are halides, e.g., chlorides, fluoride, etc.; nitrate, sulfate, phosphate, etc.

bis-dicarbollyl palladium(IV)
bis-dicarbollyl iridium(IV)
bis-monocarbollyl platinum(II)
bis-monocarbollyl platinum(III)chloride
monocarbollyl dicarbollyl ruthenium(IV)chloride
monocarbollyl dicarbollyl palladium(III)
bis-dicarbollyl rhodium(IV)
bis-monocarbollyl osmium(II)
bis-B-ethoxydicarbollyl palladium(II)
bis-(dimethyldicarbollyl)platinum(IV)
bis-phenylmonocarbollyl iridium(IV)
bis-B-tetrahydrofuran dicarbollyl ruthenium(II)
bis-B-pyridine monocarbollyl osmium(O)
bis-B-triethylphosphinedicarbollyl palladium(II).

SOLVENTS

The carbollyl metal complexes are stable and soluble in a variety of solvents. The neutral species are soluble in organic solvents while the ionic species are soluble in aqueous and polar organic solvents. Since the carbollyl metal complexes are highly electrophillic, solvents that are readily oxidized such as amines, alcohols, aldehydes, sulfides, etc., should be used with caution. Examples of other suitable solvents are hydrocarbons, halogenated hydrocarbons, ketones, esters, ethers, amides, carboxylic acids, nitriles, etc.

Hydrocarbons useful as solvents include the aromatic, aliphatic and alicyclic hydrocarbons such as benzene, toluene, xylene, cumene, ethylbenzene, pseudocumene, durene, naphthalene, α-methylnaphthalene, indene, butane, pentane, hexane, isooctane, decane, 2-ethyldodecane, cyclohexane, cycloheptane, methylcyclopentane, ethylcyclohexane, dimethylcycloheptane, cyclooctane, etc. Mixtures of the aforementioned as well as petroleum distillates can also be suitable solvents such as naphtha, kerosine, etc.

Halogenated hydrocarbons such as dichloroethane, chloroform, carbon tetrachloride, dichlorodifluoroethane, chlorobutane, difluoropropane, chlorocyclpentane, iodobenzene, dibromoethane, dichlorobenzene, etc., can also be suitable solvents.

Ketones such as acetone, methylethyl ketone, diisopropyl ketone, methylamyl ketone, furan, isopropylfuran, valerolactone, methyldecyl ketone, pyran, ethylpyran, pyron, benzofuran, benzopyran, dioxane, etc., can be used as solvents. Esters of aromatic or alkanoic acids with saturated alcohols or phenols can also be used such as ethyl formate, methyl acetate, ethyl acetate, n-propyl formate, isopropyl acetate, ethyl propionate, n-propyl acetate, sec-butyl acetate, isobutyl acetate, ethyl n-butyrate, n-butyl acetate, isoamyl acetate, n-amyl acetate, ethyl formate, ethylene glycol diacetate, glycol diformate, cyclohexyl acetate, furfuryl acetate, isoamyl butyrate, diethyl oxalate, isoamyl isovalerate, methyl benzoate, diethyl malonate, valerolactone, ethyl benzoate, methyl salicylate, n-propyl benzoate, n-dibutyl oxalate, n-butyl benzoate, disoamyl phthalate, dimethyl phthalate, diethyl phthalate, benzyl benzoate, n-dibutyl phthalate, etc.

Ethers can be used such as diisopropyl ether, di-n-butyl ether, ethylene glycol diisobutyl ether, methyl o-tolyl ether, ethylene glycol dibutyl ether, diisoamyl ether, methyl p-tolyl ether, methyl m-tolyl ether, dichloroethyl ether, ethylene glycol diisoamyl ether, diethylene glycol diethyl ether, ethylbenzyl ether, diethylene glycol diethyl ether, diethylene glycol dimethyl ether, ethylene glycol dibutyl ether, ethylene glycol diphenyl ether, triethylene glycol diethyl ether, diethylene glycol di-n-hexyl ether, tetraethylene glycol dimethyl ether, tetraethylene glycol dibutyl ether, etc.

Another class of organic solvents that have sufficient solvency are various amides such as formamide, dimethyl formamide, ethylisopropyl formamide, acetamide, n-phenylacetamide, N,N-dipropylacetamide, isobutyramide, N-ethylisobutyramide, isovaleric amide, N,N-dimethylisovaleric amide, isocaprylic amide, N,N-methyl-n-caprylic amide, N-propylene-n-heptanoic amide, isoundecylic amide, etc.

Carboxylic acids include formic, acetic, propionic, butyric, pentanoic, hexanoic, heptanoic, octanoic acids, benzoic, toluic, phthalic acids, etc. Of these, the fatty carboxylic acids having from about 2 to about 8 carbons are preferred. The carboxylic acids are not entirely inert under the oxidation conditions in that the carboxylic acids add to the olefin double bond to form beta-acyloxy compounds. These materials, however, can be readily pyrolyzed to recover both the carboxylic acid for reuse as the reaction medium and the desired unsaturated acid.

Nitriles such as acetonitrile, isopropionitrile, valeronitrile, capronitrile, etc., can also be used as solvents for the carbollyl metal complexes.

EXAMPLES

Example 1.—Preparation of carborane

This example illustrates the preparation of 1,2 - dicarbaclovododecaborane(12) from decaborane and acetylene. The preparation is performed in a one-liter round-bottom, three-necked flask which is fitted with an automatic temperature control device in one of the necks, a spark-free stirring motor with a stirring rod extending through the center neck, and a water-cooled condenser attached to the remaining neck. The condenser connection has a concentric tube used for introduction of acetylene and this tube is extended to beneath the liquid level of the reactants in the round bottom flask. The water-cooled condenser is placed upright for total reflux and the upper end of the condenser is fitted with a U-shaped, Dry Ice cooled condenser and the gases from the Dry Ice condenser are passed into an empty 125 milliliter Erlenmeyer flask and then below the liquid level of a similar flask partially filled with oil.

The gas introduction train consists of a nitrogen cylinder and an acetylene cylinder which are manifolded into a purification train comprising a first 1000 milliliter Erlenmeyer flask and then three 500 milliliter round-bottom flasks connected in series having gas introduction tubes at the bottom of the flask fitted with extra coarse gas dispersion tubes and filled from ⅓ to ½ with concentrated sulfuric acid. The gas exit from the last purification flask is passed to an empty 1000 milliliter Erlenmeyer vessel and then to the base of a column three feet in height that is packed with a mixture of potassium hydroxide and a drying agent such as anhydrous calcium sulfate. The top of the column is connected to another empty 1000 milliliter Erylenmeyer flask and the gases are removed from this Erlenmeyer flask and passed to the tube extending through the neck of the 1000 milliliter reaction vessel. The empty Erlenmeyer flasks are employed to serve as traps for liquids which may inadvertently back up through the system. The empty trap between the sulfuric acid and the potassium hydroxide column is used to collect any sulfuric acid foam from the last purification vessel.

The system is thoroughly dried and flushed with nitrogen before the reagents are introduced. Thereafter 100 grams of decaborane which has been purified by sublimation or recrystallization from a hydrocarbon such as heptane is dissolved in 200 milliliters of n-propyl ether which has been freshly distilled from a mixture containing sodium and benzophenone. The solution is placed in the 1000 milliliter 3-necked flask and 200 milliliters of diethyl sulfide which has been dried by passage over a dehydrated 4-angstrom molecular sieve is thereafter added. Nitrogen is then passed through the flask while the solution is stirred for three hours at 40° C. and then the temperature is raised to 65°–67° C. and maintained at this temperature for two hours. Thereafter the flask contents are heated to the temperature of 85°±2° C. and 7 mols of acetylene are passed through the purification train and into the reaction vessel over a period of 35 hours. On completion of the reaction the solution has a pale yellow to light orange color.

The reactants are then cooled to room temperature and the reaction mixture is transferred to a one-liter, round-bottom, single-necked flask and the diethyl sulfide and n-propyl ether solvent is removed in a vacuum evaporation step. The flask is rotated continuously during the evaporation and is heated with a steam bath. The volatiles are condensed and collected in a Dry Ice trap. Upon removal of the solute and diethyl sulfide, the product is a light brown semisolid. The solid is dissolved in 150 milliliters of benzene and the solution is then transferred to a three-liter, three-necked flask fitted with a stirrer, condenser and pressure equalized, closed additional funnel. The addition funnel is also fitted with a connection to a source of nitrogen so that nitrogen can be used to purge and sweep the flask contents. Over a two-hour period a solution of 150 milliliters of acetone, 400 milliliters methanol and 150 milliliters concentrated hydrochloric acid are introduced into the flask to convert the reactive byproducts to hydrogen and borates. The flask contents are stirred for an additional 12 hours until no more gas is evolved and the resultant solution is then placed in a one-liter addition funnel and added slowly to three gallons of water maintained at a temperature of 95°–100° C. Some decomposition of additional byproducts occurs; the hydrochloric acid and acetone are extracted into the water phase and the benzene is vaporized from the system. The aqueous mixture is stirred for an additional 10 minutes and the crude carborane which separates as a solid in the aqueous phase is removed and dissolved in 500 milliliters methanol in a two-liter Erlenmeyer flask.

The crude carborane is then purified by the addition of a solution of 50 grams potassium hydroxide in 75 milliliters of water and agitated for 3 minutes, then poured into 3 gallons of ice water, stirred for 10 minutes, and filtered. The filtered solid is then dried in a vacuum over phosphorus pentoxide and the dried product is mixed with 30 grams anhydrous calcium chloride and placed in thimble of a Soxhlet extraction apparatus. The mixture is extracted with 500 milliliters of heptane for 20 hours. The carborane is recovered from the heptane by crystallization and filtration by placing the heptane in a rotary evaporator heated with a steam bath to evaporate the heptane to 50 milliliters. After separation of the carborane, the filtrate is cooled and a second crop of carborane is obtained. The combined yield after drying is about 85 grams and an additional 3 to 4 grams of impure material may be obtained by evaporating the hexane solution to dryness. In repeated runs this impure material can be added to the mixture in the Soxhlet thimble for further purification.

Example 2.—Preparation of bromomethylcarborane

The following illustrates the preparation of 1-bromomethyl-1,2-dicarbaclovodecarborane(12). A three-necked flask and the apparatus described in the previous experiment is employed in the preparation of the bromomethylcarborane. The reaction flask is purged and filled with nitrogen, then charged with 49.9 grams decaborane, 32 milliliters acetonitrile, 35 milliliters propargyl bromide and 350 milliliters of benzene. The solution is stirred and heated at reflux temperature for two hours and thereafter the introduction of the propargyl bromide is initiated by introduction of 11 milliliters of the propargyl bromide through a nitrogen-filled addition funnel dropwise over a one-hour period. The addition funnel is then removed, the flask stoppered and the solution is maintained at reflux temperature for 1½ hours and then the flask is unstoppered, the addition funnel is replaced, and an additional quantity of 11 milliliters propargyl bromide is introduced. After 1½ hours of stirring of the flask contents at reflux temperature, the remainder of the propargyl bromide is introduced and the flask contents are again stirred for 1½ hours at reflux temperature.

The solution is then cooled to room temperature and washed with benzene into a single necked flask. The solvent is removed from the flask using a water aspirator vacuum and gentle heating from a steam bath. The residue in the flask is then cooled to room temperature, removed from the vacuum and 200 milliliters of hexane is added and stirred with the residue to extract most of the carborane. The hexane extract is decanted and the brownish tar is again extracted with 40 milliliters of hexane. The second extraction converts the tar residue to a solid which is removed by filtration and washed on the filter with an additional 40 milliliters of hexane. The combined hexane extracts are filtered and washed in a separatory funnel with four 100 milliliter portions of chilled aqueous 10 weight percent sodium hydroxide solution and then with four 100 milliliter portions of water. The hexane solution, yellow in color, is dried over anhydrous magnesium sulfate and filtered and the solvent is then evaporated in a rotary evaporator using a water aspirator.

The carborane remaining in the evaporator flask is washed with a small amount of pentane into a single necked 300 milliliter flask which is attached to an alembic column. Glass wool is placed in the solution, in the neck of the alembic distillation column, and at the top of the column to inhibit bumping during the distillation. The distilling flask, collecting flask and column are continuously evacuated with a high vacuum system. When the bulk of the pentane and residual hexane have distilled away, the temperature of the water bath surrounding the distillation flask is raised from room temperature to 125° C. over a one-hour period. When the distillation rate slows appreciably, the flask contents are raised to 150° C. and maintained there until no more distillate is obtained. The distillation flask is then cooled to room temperature, the vacuum is reduced on the system, and the product is removed to recover 86.5 grams of distilled product. The bromomethylcarborane may be further purified by crystallization from pentane or methanol if desired.

Example 3.—Methylcarborane

The following describes the preparation of 1-methyl-1,2-dicarbaclovodecaborane(12). This material is prepared by hydrolysis of the Grignard reagent formed from the reaction of bromomethylcarborane; see the preceding preparation; with magnesium in the presence of diethyl-ether. The preparation is carried out in a one-liter, 3-necked flask equipped with a mechanical stirrer, reflux condenser, pressured equalized, closed addition funnel and nitrogen inlet. The flask is maintained filled with nitrogen throughout the course of the reaction. The flask is charged with 6.1 grams magnesium chips, 50 milliliters of anhydrous diethylether, warmed to 30° C., and then a solution of 50 grams of distilled gromomethylcarborane dissolved in 300 milliliters of anhydrous diethylether is introduced slowly into the flask while the flask contents are stirred. The flask is gently warmed to reflux temperature and then the heating mantle is removed and the addition of the carborane solution is maintained at a rate sufficient to maintain the reflux temperature. The bromoethylcarborane solution is added within about 35 minutes and the stirred reaction mixture is then maintained at reflux temperature by heating for 2½ hours.

The solution is then cooled to room temperature and is decanted from the excess magnesium into a 2-liter beaker half-filled with crushed ice. The carboranyl magnesium bromide is washed into the ice mixture with two 50 milliliter portions of diethylether. Hydrochloric acid of 3 normality in a sufficient quantity to dissolve the magnesium salts is added to the stirred ice mixture and the ether and water layers are separated. The water layer is extracted three times with 75 milliliter portions of diethylether. After the combined ether extracts are dried over anhydrous magnesium sulfate, the ether is removed in a rotary evaporator. The evaporator flask contents are then dissolved in 90 milliliters of hot methanol and the solution is permitted to cool slowly to 0° C. The methyl carborane crystallizes from the methanol and is filtered therefrom. A portion of the methanol liquor is removed, heated and water added to the solution until it becomes cloudy. The solution is then cooled to 0° C. to obtain an additional crop of methyl carborane crystals. The combined crops are dried in a vacuum to yield 31 grams of methyl carborane.

Example 4.—Dimethylcarborane 1,2-dimethyl - 1,2 - dicarbaclovodecaborane(12) is prepared by the hydrolysis of the Grignard reagent formed from the reaction of bromomethylcarborane with magnesium in the presence of tetrahydrofuran.

A one-liter, three-necked flask equipped with a mechanical stirrer, reflux condenser, addition funnel and nitrogen inlet is thoroughly dried and flushed with nitrogen. Into the flask is placed 6.1 grams of clean magnesium chips and about 15 milliliters of tetrahydrofuran. The closed addition funnel is charged with 50 grams of distilled bromomethylcarborane dissolved in 250 milliliters of tetrahydrofuran. About 50 milliliters of the solution is then rapidly added to the stirred magnesium suspension to cause initiation of the Grignard reaction. The rate of addition is controlled thereafter so that the heat of the reaction is sufficient to maintain reflux temperaure. After addition is complete, the flask is maintained at reflux temperature for an additional 2.5 hours.

The cooled reaction solution is rapidly decanted under nitrogen from the excess magnesium into a second one-liter, three-necked flask equipped with a mechanical stirrer, addition funnel, Dry Ice condenser and nitrogen inlet. The addition funnel of this flask is charged with 48 grams of methyl iodide and the methyl iodide is then added dropwise to the solution in the flask at an addition rate to maintain a reflux temperature. Upon completion of the addition of methyl iodide, the solution is maintained at the reflux temperature for an additional 3 hours and then cooled. The cooled mixture is then slowly added to about 400 milliliters of chilled dilute 1 N hydrochloric acid. The product is extracted with 250 milliliters of dethylether and then with 375 millilter portons of diethylether. The combined ether extracts from the aqueous phase are washed once with 75 milliliters of water and then dried over magnesium sulfate. The diethylether solvent is then evaporated under vacuum using a rotary evaporator and the flask contents are then dissolved in ethanol. The product is separated from the ethanol by crystallization by cooling the ethanol and additional crops of crystals are obtained from the mother liquor by concentrating the mother liquor and adding water to the solution until it becomes cloudy and then cooling the solution to 0° C. The total of 33 grams of product is crystallized from the ethanol liquor.

Example 5.—Phenylcarborane

1 - phenyl - 1,2 - dicarbaclovododecaborane(12) is prepared from decaborane, acetonitrile and phenylacetylene following a procedure similar to that set forth in Experiment 2 for the preparation of bromomethylcarborane. The reaction flask is charged with 50 grams purified decaborane, 22 milliliters acetonitrile and 500 milliliters benzene. The solution is refluxed for two hours and thereafter the 42 grams of phenylacetylene is added dropwise and the mixture is then refluxed for 30 hours. The solvent is removed under vacuum in a rotary evaporator, the residue is extracted with 1 milliliter pentane and the pentane solution is washed 4 times with 100 milliliter portions of 10 weight percent sodum hydroxide solution. The pentane solution is then dried over anhydrous magnesium sulfate and the solvent is removed with a rotary evaporator at reduced pressures to give 61.5 grams of crystalline phenylcarborane.

Example 6.—Phenylcarborane isomerization 1-phenyl-1,7-dicarbaclovodecarborane(12) is prepared by thermal rearrangement of the phenylcarborane prepared in the preceding expeiment. This thermal rearrangement is performed in a 100 milliliter stainless steel autoclave which is charged with 5 grams of the phenylcarborane of the preceding example. The autoclave is evacuated with a mechanical vacuum pump and then heated electrically to a temperature of 420° C. for 24 hours. After cooling, the contents of the autoclave are dissolved in 30 milliliters of pentane and analyzed by thin layer chromatography to obtain 3.4 grams of the 1-phenyl-1,7-dicarbaclovodecarborane and 1.5 grams of the unconverted 1-phenyl-1,2-carborane.

Example 7.—C-ammonylmonocarborane

An ammonium monocarborane is prepared by the reaction of decaborane(14) with an isocyanide. The decaborane is charged to the reaction flask in benzene and ethyl isocyanide is added at room temperature. After one hour at room temperature, the flask contents are filtered, the separated solid is dried and dissolved in hot water. The aqueous extract is then cooled to yield about 70 percent of an ammonium monocarborate, $C_2H_5NH_2CB_{10}H_{12}$.

Example 8.—C-ammonylmonocarborane

In another preparation, decaborane(14) is reacted with sodium cyanide by the addition of 0.28 gram of decarborane to a solution of 0.35 gram sodium cyanide in 200 milliliters water. The solution is stirred for 5 hours at 25° C. and then passed over a hydrogen charged ion exchange solid (Amberlite IR–120). The effluent comprises an aqueous solution of C-ammonylmonocarborane.

Example 9.—Dicarbadodecahydroundecaborates

The following experiments describe the preparation of (3)-1,2-dicarbadodecahydroundecaborates:

The 1,2-dimethyl-(3)-1,2-dicarbadodecahydroundecaborate (—1); $[B_9C_2H_{10}(CH_3)_2]^{-1}$ is prepared by the treatment of dimethylcarborane with alcohol base to abstract a boron atom from the carborane. This reaction is performed in a 500 milliliter, three-necked flask equipped with a reflux condenser, a mechanical stirrer and a nitrogen inlet. To the flask is charged a solution of 20 grams potassium hydroxide in 300 milliliters of absolute ethyl alcohol. The solution is cooled to room temperature and then 30 grams of dimethylcarborane is added and the solution is stirred for one hour at room temperature and then heated to reflux temperature and maintained at the temperature until the evolution of hydrogen has ceased. The flask contents are then cooled and an additional 100 milliliters of absolute ethyl alcohol is added and carbon dioxide is then introduced into the solution to precipitate excess potassium hydroxide as the carbonate. The precipitate is removed by filtration and washed five times with 50 milliliter portions of absolute ethyl alcohol. The combined filtrate and washings are evaporated to dryness to yield a crude potassium salt which is water soluble and which can be base-exchanged with other cations such as trimethyl ammonium, cesium, etc.

OTHER DICARBADODECAHYDROUNDECA-BORATE DERIVATIVES

The (3)-1,2-dicarbadodecahydroundecaborate(−1) ion, the 1-phenyl-(3)-1,2-dicarbadodecahydroundecaborate(−1) ion, and the (3)-1,7-dicarbadodecahydroundecaborate(−1) ion are prepared in the same manner with the exception that the 1,7-isomer is formed under higher temperature conditions than the corresponding 1,2-isomers. This is accomplished by carrying out the initial alcoholic potassium hydroxide degradation in a stirred autoclave under pressure at about 150° C.

Example 10.—Dicarbollide preparation

The dicarbollide ions were prepared from the products of the preceding example by treatment to abstract a proton from the face of the dicarbadodecahydroundecaborate ions described in the preceding examples. The first preparation uses an alkali metal in a solvent while the second method utilizes an alkali metal hydride.

ANHYDROUS DICARBOLLIDE PREPARATION

In this preparation a 500 milliliter, three-necked flask fitted with a mechanical stirrer, nitrogen inlet and reflux condenser is charged with 100 milliliters tetrahydrofuran and 6.1 grams of sodium metal dispersed in a mineral oil. The mixture is stirred and then 17.3 grams of potassium dicarbadodecahydroundecaborate is added under a stream of nitrogen. The flask is heated to reflux temperature and hydrogen is rapidly evolved. The solution is maintained at reflux tetmperature for 20 hours and the excess sodium is removed. The precipitate in the cooled flask is then recovered by filtration and this comprises the disodium-(1)-2,3-dicarbollide $(Na_2B_9C_2H_{11})$. This material can be purified by extraction in a Soxlet apparatus with 500 milliliters of sodium dried benzene while maintained under a nitrogen atmosphere for 48 hours. The unextracted residue comprises 3.2 grams and is recovered and dried.

ALTERNATIVE ANHYDROUS CARBOLLIDE PREPARATION

An alternate method for carbollid epreparation comprises charging 1.51 grams sodium hydride in 90 milliliters tetrahydrofuran to the 500 milliliter three-necked reaction flask and adding thereto 5 grams of the trimethylammonium dicarbadodecahydroundecaborate dissolved in 75 milliliters of tetrahydrofuran. The reaction mixture is stirred at reflux temperature under nitrogen for 3 hours or until no more gas is evolved. After completion of the reaction, the stirring is ceased and excess sodium hydride is permitted to settle and the solution is decanted and is suitable for use if promptly reacted with a metal complex to form the dicarbollyl metal complex.

Example 11

The following will illustrate the preparation of carboranes having alkyl or aryl substitutents on the boron atoms and the preparation of carbollides therefrom.

The sodium hydride procedure of Example 10 is followed to prepare a solution of sodium dicarbollide in tetrahydrofuran. Excess sodium hydride is permitted to settle and the tetrahydrofuran solution is decanted under nitrogen from the crude product. The decanted solution is frozen with liquid nitrogen and the flask is connected to a vacuum line together with a flask containing 4.5 grams phenyl boron dichloride which distills into the flask containing the dicarbollide. The application of the vacuum is discontinued and the dicarbollide flask is slowly warmed to melt the solution. Sodium chloride precipitates from the solution in the flask and, after the flask has reached room temperature, its contents are filtered to separate the sodium chloride.

The solvent is then evaporated from the carbone, $B_{10}C_2H_{11}C_6H_5$, which is obtained as a liquid oil.

The carbone is then treated by the procedure of Example 9 to prepare the potassium B-phenyl dicarbadodecahydroundecaborate by abstraction of a boron atom with the alcoholic potassium hydroxide solution.

The potassium B-phenyl dicarbododecahydroundecaborate $K[B_9C_2H_{11}C_6H_5]$ is dissolved in tetrahydrofuran containing sodium hydride according to the procedure of Example 10. This treatment results in formation of a solution of the sodium and potassium dicarbollide salts, $Z_2[B_9C_2H_{10}C_6H_5]$ which can then be used to prepare the dicarbollyl metal complexes in the manner set forth in subsequent examples.

The procedure is repeated; however, 3.5 grams isopropyl boron dichloride are substituted for the phenyl boron dichloride previously described. Following the same procedure results in formation of the isopropyl derivative, $Z_2[B_9C_2H_{10}CH(CH_3)_2]$.

Example 12

The following example will illustrate the preparation of carboranes having ligand substituents on face boron atoms. These carboranes can be treated in the same manner as set forth in Example 10 to prepare dicarbollide anions which can then be reacted as indicated in Example 13 in the preparation of carbollyl metal complexes.

B-TETRAHYDROFURAN DERIVATIVES

The B-tetrahydrofuran substituted dicarborane $(B_8C_2H_{11}BTHF)$ and its C-phenyl and C,C'-dimethyl derivatives are prepared by an oxidative substitution reaction. The preparation is performed in the three-necked, two-liter flask previously described, having a mechanical stirrer, pressure equalized addition funnel and a 12-inch distillation column with a take-off head and reflux condenser. An inlet is provided to allow nitrogen to be introduced under the liquid level through a medium porosity fitted glass dispersion tube. To the flask is added (under a stream of nitrogen), 500 milliliters of benzene which has previously been dried over sodium ribbon, 20 milliliters of freshly distilled tetrahydrofuran and 8.6 grams of benzene extracted potassium dicarbadodecahydroundecaborate.

A solution of anhydrous ferric chloride in tetrahydrofuran is prepared in a 500 milliliter Erlenmeyer flask equipped with a magnetic stirrer by introducing (under a stream of nitrogen), 200 milliliters of sodium dried benzene and 40 milliliters of freshly distilled tetrahydrofuran and then adding thereto with stirring 16.2 grams of sublimed anhydrous ferric chloride.

The resultant deep red solution is transferred to the addition funnel of the two-liter flask under a stream of nitrogen. The stirred solution in the 2-liter flask is then heated to reflux temperature and the ferric chloride solution is added dropwise from the pressure equalized addition funnel over a period of one hour. As the ferric chloride solution contacts the refluxing solution int he flask, the ferric chloride is decolorized, hydrogen chloride is evolved and a solid precipitate is formed. The hydrogen chloride is removed from the mixture by sweeping nitrogen through the solution and after the ferric chloride solution has been added to the 2-liter flask, the excess tetrahydrofuran is distilled over head through the distillation column at a reflux ratio of about 10.1. The distillation is continued until the boiling point of the overhead distillate is that of benzene (80°) and then the reaction mixture is cooled to room temperature and filtered through a Buchner funnel.

The solid precipitate on the funnel is washed with hot benzene, the filtrate and washings are combined, placed in a separatory funnel and washed with 200 milliliter portions of distilled water until the aqueous phase is neutral to pH paper. The benzene solution is then dried over anhydrous magnesium sulfate and evaporated under vacuum to approximately 200 milliliters volume using a rotary evaporator. During the evaporation the flask contents are warmed to about 50° C. with a water bath. Approximately 100 milliliters of heptane are then added to the flask contents and the resultant solution is chilled in a methanol ice bath to recover a product by crystallization comprising 6.1 grams. Further concentration and crystallization of the mother liquor yields an additional 4 grams of product. The product is a mixture of *symmetrical* and *asymmetrical* $B_9C_2H_{11}THF$.

Using the same procedure, 13 grams of $$(CH_3)_3NHB_9C_2H_{11}(C_6H_5)$$

gave 13.4 grams of $B_9C_2H_{10}(C_6H_5)THF$. Similarly, 15 grams of $CsB_9C_2H_{10}(CH_3)_2$ reacted to give 11.2 grams of the mixed isomers of $B_9C_2H_9(CH_3)_2THF$.

B-PYRIDINE DERIVATIVES

The procedure of Experiment 12 is repeated, substituting pyridine for tetrahydrofuran previously employed and reacting 10 grams of $(CH_3)_3NHB_9C_2H_{12}$ to obtain 10.8 grams of $B_9C_2H_{11}PY$. Using the same procedure substituting pyridine for the tetrahydrofuran and 15 grams of $CsB_9C_2H_{10}(CH_3)_2$ yields 11.9 grams of $B_9C_2H_9(CH_3)_2PY$.

The C-phenyl derivative is prepared by the reaction of 13 grams of $(CH_3)_3NHB_9C_2H_{11}(C_6H_5)$ with pyridine in the presence of ferric chloride. Following the procedures set forth above 13.8 grams of $B_9C_2H_{10}(C_6H_5)PY$ is obtained.

B-ACETONITRILE DERIVATIVES

The substitution of acetonitrile for the tetrahydrofuran in the general procedure described in Experiment 12 results in the preparation of a boron-substituted acetonitrile derivative. Excess acetonitrile from the reaction is distilled from the reaction mixture as a 34 percent acetonitrile benzene azeotrope which boils at 73° C. The reaction is performed by charging 13 grams of the cesium salt of the dicarbadodecahydroundecaborate to the reaction flask and reacting it with acetonitrile in the presence of ferric chloride to produce 8.4 grams of the acetonitrile derivative, $B_9C_2H_{11}CH_3CN$.

The procedure is repeated charging 15 grams of the cesium salt of the 1,2-dimethyl-1,2-dicarbadodecahydroundecaborate to the reaction flask and reacting this material with acetonitrile in the presence of ferric chloride to produce 10.1 grams of the acetonitrile dimethyl derivative having the following formula:

$$B_9C_2H_9(CH_3)_2CH_3CN$$

In a similar fashion, acetonitrile is reacted in the presence of ferric chloride with 12 grams of the potassium salt of C-phenyl dicarbadodecahydroundecaborate to produce 10.9 grams of the acetonitrile derivative having the following formula:

$$B_9C_2H_{10}(C_6H_5)CH_3CN$$

DIETHYL SULFIDE DERIVATIVES

The diethyl sulfide derivative of the dimethyl dicarbadodecahydroundecaborate is prepared by charging 15 grams of cesium dicarbadodecahydroundecaborate to the reaction flask and reacting this material with diethylsulfide in the presence of ferric chloride. The excess diethyl sulfide is separated from a benzene solution of the crude reaction products by chromatographic separation. This is achieved by dissolving a crude product in benzene and applying the solution to a chromatograph column one inch in diameter by four feet in length and eluting the solution with a mixture of 60 percent benzene and 40 percent pentane. The excess diethylsulfide is removed in the solvent front and discarded. The remainder of the column effluent is evaporated to dryness to yield 11.4 grams of the solid diethylsulfide derivative, $B_9C_2H_9(CH_3)_2S(C_2H_5)_2$. This material comprised a mixture of the asymmetric and symmetric isomers.

TRIPHENYLPHOSPHINE DERIVATIVES

The triphenylphosphine substituted borane and its C,C'-dimethyl derivative is prepared by charging 11 grams of the trimethyl ammonium salt of dicarbadodecahydroundecaborate to the reaction flask together with 500 milliliters benzene, and 26 grams of triphenyl phosphine. The pressure equalized addition funnel is equipped with a 2 milliliter glass tube which extends to just above the stopcock in the addition funnel. A slurry of ferric chloride in benzene is placed in the addition funnel and maintained in a fluidized condition by bubbling a stream of nitrogen through this 2 milliliter dip tube. The remainder of the reaction is carried out according to the procedure described in the preparation of the tetrahydrofuran derivatives. After completion of the reaction the crude product is filtered, washed and dried and evaporated to dryness to give a solid residue. The residue is placed in a Soxlet extractor and extracted with 250 milliliters of heptane for about 2 hours under nitrogen to remove excess triphenyl phosphine. Upon completion of the extraction, the unextracted residue is re-crystallized from a benzene-heptane mixture to give 15.2 grams of the triphenyl phosphine derivative $B_9C_2H_{11}P(C_6H_5)_3$. This material is analyzed and found to comprise a mixture of the symmetric and asymmetric isomers.

The same procedure is repeated charging 15 grams of the cesium salt of the 1,2-dimethyl-1,2-dicarbadodecahydroundecaborate with 52.4 grams of triphenyl phosphine in the presence of ferric chloride to give 10.2 grams of crystalline $B_9C_2H_9(CH_3)_2P(C_6H_5)_3$ which is a mixture of the symmetric and asymmetric isomers.

B-ETHOXY DERIVATIVE

The B-alkoxy derivative is prepared by performing a ligand exchange reaction with the tetrahydrofuran ligand derivative previously prepared. This reaction is performed by charging the symmetrical isomer of $B_9C_2H_9(CH_3)_2$-tetrahydrofuran to potassium hydroxide in ethanol and heating the resulting solution for a few minutes and then diluting it with an equal volume of water. To the reaction flask is then added tetramethylammonium chloride and the alcohol was allowed to evaporate slowly at room temperature. As the alcohol evaporated, crystals of the trimethylammonium salt of the monovalent $$B_9C_2H_9(CH_3)_2OCH_2CH_3^{-1}$$

anion precipitate. This ligand derivative is the symmetrical derivative indicating that no isomerization occurs during the ligand exchange.

Example 13.—Noble metal complexes

A bis(dicarbollyl)palladium complex is prepared from an acetylacetonate complex of palladium. The acetylacetonate complex is prepared by adding 3.4 grams 2,4-pentanedione and 13.2 milliliters of 10 percent sodium hydroxide to 50 milliliters water, then adding the resultant solution to a suspension of 2 grams palladium chloride in 200 milliliters water. The complex is precipitated as a yellow solid and the admixed solutions are stirred at 80° C. for about 70 minutes, then cooled and filtered to remove the palladium acetylacetonate which is purified by extraction into heptane and subsequent crystallization therefrom.

To a solution of 3 grams sodium dicarbollide in tetrahydrofuran is added one gram of the palladium acetylacetonate and a deep red color forms in the solution. The solvent is evaporated under vacuum and the residue is dissolved in water and excess tetramethylammonium chloride is then added to precipitate the complex as the tetramethylammonium salt. The complex is identified by nuclear magnetic resonance and by infrared spectroscopy as the tetramethylammonium bis-(3)1,2-dicarbollyl palladate complex:

$$[(CH_3)_4N][B_9H_9C_2(CH_3)_2]_2Pd(II)$$

The tetramethyl ammonium bis-dicarbollyl pallate salt is exposed to air at ambient temperatures and the red color of the salt changes to yellow. Analysis by high resolution mass spectroscopy reveals the yellow product to be the electroneutral bis-C,C-dimethyldicarbollylpalladium(IV), $Pd[B_9C_2H_9(CH_3)_2]_2(IV)$.

In another preparation a small amount (1.0 gram) of palladium acetylacetonate is dissolved in tetrahydrofuran and the resultant solution is added to a tetrahydrofuran solution of sodium dicarbollide ($Na_2B_9C_2H_{11}$), the dicarbollide being present in about 10 times the molar equivalent of the palladium. Upon the admixture of the solutions at room temperature, a deep red color forms, characteristic of the bis-dicarbollylpalladium complex. The admixture is evaporated, the residue is dissolved in methylene chloride and the resultant solution is slowly passed through a column of silica gel at a rate of about .01 volume per volume of silica gel per minute. During passage over the silica gel, the ionic complex $$[Pd(B_9C_2H_{11})_2]^{-2}$$

is retained on the silica gel and slowly oxidized by adsorbed oxygen from the silica gel to the neutral form, $Pd(B_9C_2H_{11})_2(IV)$ and the latter material is obtained in purified form dissolved in the methylene chloride effluent from the column. Impurities such as excess dicarbollide salt and sodium acetylacetonate are retained on the column.

A boron-phenyl substituted complex is prepared by adding a small amount of palladium acetylacetonate dissolved in tetrahydrofuran to the solution of sodium and potassium dicarbollide salts prepared in the procedure described in Example 11. The molar quantity of dicarbollide is 15 times that of palladium and resultant admixture is evaporated to dryness, the residue is dissolved in methylene chloride and the resulting solution is passed through a column of silica gel to recover the purified neutral form of the complex, $Pd(B_9C_2H_{10}C_6H_5)_2(IV)$.

The procedure is repeated with the isopropyl derivative prepared in accordance with the procedure of Example 11 and a small amount of rhodium acetylacetonate, the carbollide being used in ten molar times the amount of the rhodium complex to preclude decomposition of the carbollide, and the neutral complex $$Rh[B_9C_2H_{10}CH(CH_3)_2]_2(IV)$$

is obtained.

A boron ligand substituted compler is prepared by adding a small amount of palladium acetylacetonate dissolved in tetrahydrofuran to a solution containing 20 moles sodium B-tetrahydrofuran-C-phenyl dicarbollide, $NaB_9C_2H_9(C_6H_5)THF$ per mol of the palladium complex. The dicarbollide is obtained from the $$B_9C_2H_{10}(C_6H_5)THF$$

prepared in the manner described in Example 12 by admixing it under nitrogen with an anhydrous tetrahydrofuran and mineral oil suspensions of sodium metal in accordance with the precedure of Example 10. The admixture of the palladium containing solution and the dicarbollide solution is then evaporated to dryness and the residue is dissolved in benzene at 30° C. The benzene solution is evaporated and cooled to separate crystals of the palladium complex; $[B_9C_2H_8(C_6H_5)(C_4H_8O)]_2(II)$.

The procedure is repeated with the B-pyridine, C,C-dimethyl dicarbadodecahydroundecaborane which is prepared according to the procedure of Example 12. The dicarbollide is first prepared by reaction with sodium metal as described in Example 10 and to 100 milliliters of tetrahydrofuran containing 10 grams of the dicarbollide are added 1 gram of palladium acetylacetonate in 50 milliliters of tetrahydrofuran. The solution is then evaporated to dryness and the residue is dissolved in benzene. The benzene solution is then concentrated by evaporation and cooled to separate crystals of $$Pd[B_9C_2H_8(C_5H_5N)(CH_3)_2]_2(II)$$

Tetramethylammonium bis - monocarbollylpalladate, $[(CH_3)_4N]_2Pd(B_{10}CH_{11})_2(IV)$, is prepared by the following procedure. The aqueous solution of the C-ammonylmonocarbons prepared in Example 8 is evaporated to dryness and the residue is dissolved in tetrahydrofuran. The solution is then added to a suspension of sodium metal in tetrahydrofuran and mineral oil to prepare the carbollide in accordance with the procedure of Example 10. A solution of 1 gram palladium acetylacetonate in 50 milliliters tetrahydrofuran is admixed at room temperature with a solution containing 5 grams of the carbollide to prepare the tetravalent anion $Pd(B_{10}CH_{11})_2^{-4}(II)$. Exposure of the solution to air oxidizes the complex to the divalent $Pd(B_{10}CH_{11})_2^{-2}(IV)$ which is recovered as the tetramethylammonium salt by evaporating the solution to dryness, dissolving the residue in water and adding a slight excess of tetramethylammonium chloride to the resultant solution to precipitate the salt.

The acetonitrile derivative of Example 12, $$B_9C_2H_{11}CH_3CN$$

is treated according to Example 10 to prepare 5 grams of the dicarbollide salt $NaB_9C_2H_{10}CH_3CN$ and a solution of 1 gram iridium acetylacetonate in 50 milliliters tetrahydrofuran is then added to form the bis-carbollyl iridium complex. The complex is recovered by evaporating the preparative solution to dryness, dissolving the residue in benzene and concentrating the benezene solution by evaporation following by cooling to crystallize the electroneutral iridium(IV) complex, $$Ir(B_9C_2H_{10}CH_3CN)_2(II)$$

The B-diethylsulfide derivative of dimethyl dicarbadodecahydroundecarborate prepared as described in Example 11 is dissolved in a suspension of sodium metal in tetrahydrofuran and mineral oil to prepare the dicarbollide in the manner described in Example 10. To the resulting solution is then added a solution of platinum acetylacetonate dissolved in tetrahydrofuran; mol ratio carbollide to meteal of 5:1. The bis-carbollyl platinum complex forms immediately at room temperature and the preparative solution is evaporated to dryness and the residue is dissolved in benzene and the electroneutral complex, $Pt[B_9C_2H_8(CH_3)_2S(C_2H_5)_2]_2(II)$, is crystallized therefrom.

The sodium salt of the B-ethoxy derivative of dimethyl dicarbadodecahydroundecaborate prepared by the procedure of Example 12 is treated with sodium hydride in the manner described in Example 10 to prepare the dicarbollide. To the resulting solution, of 6 grams of dicarbollide at room temperature, is added 50 milliliters of a tetrahydrofuran solution containing 1 gram platinum acetylacetonate. The preparative solution is evaporated to dryness, the residue is dissolved in methylene chloride and the resultant solution is then passed over a column of fresh silica gel to obtain a purified solution of the electroneutral complex, $Pt[B_9C_2(CH_3)_2OC_2H_5]_2(IV)$.

The triphenyl phosphine derivative prepared according to Example 12 is dissolved in anhydrous tetrahydrofuran containing sodium hydride to prepare the dicarbollide in accordance with the procedure of Example 10. To the resulting solution at room temperature is added a solution of rhodium acetylacetonate in tetrahydrofuran in a quantity sufficient to provide a mol ratio of dicarbollide to metal of 7:1 and the rhodium dicarbollyl complex forms immediately. The solution is evaporated to dryness and the residue is dissolved in benzene at 30°

C. from which the purified complex is recovered by crystallization as $Rh[B_9C_2H_{11}P(C_6H_5)_3]_2$ (II).

The preceding examples are intended solely to illustrate a mode of practice of the invention and to demonstrate results obtainable therewith. It is not intended that the invention be unduly limited by the illustrated examples but, instead, it is intended that the invention be defined by the reagents and their obvious equivalents set forth in the following claims.

I claim:
1. The complex of a Group VIII noble metal and a carbollide having the following formula:

wherein:
M is a Group VIII noble metal;
Y is a ligand having from 2 to about 10 carbons and at least one atom that is oxygen, nitrogen, sulfur or a ligand having from 3 to about 18 carbons and at least one atom that is trivalent phosphorus, bismuth, arsenic or antimony;
$R_1$ has from 1 to about 6 carbons and is alkyl, aryl, alkenyl or haloalkyl;
$R_2$ is hydrogen, halogen, or from 1 to 6 carbon containing alkyl, aryl or alkenyl;
X is hydrogen or halogen;
$n$ is 0, 1 or 2;
$o$ is 1 or 2;
$p$ is 0 or 1; and
$m$ is $11-(o+n+p)$.

2. The complex of claim 1 wherein said metal is palladium.

3. The complex of claim 1 wherein said metal is platinum.

4. The complex of claim 1 wherein said metal is rhodium.

5. The salt of a complex of a Group VIII noble metal and a carbollide having the following formula:

M is a Group VIII noble metal;
Y is a ligand having from 2 to about 10 carbons and at least one atom that is oxygen, nitrogen, sulfur or a ligand having from 3 to about 18 carbons and at least one atom that is trivalent phosphorus, bismuth, arsenic or antimony;
$R_1$ has from 1 to about 6 carbons and is alkyl, aryl, alkenyl or haloalkyl;
$R_2$ is hydrogen, halogen or has from 1 to about 6 carbons and is alkyl, aryl or alkenyl;
X is hydrogen or halogen;
$o$ is 1 or 2;
$p$ is 0 or 1;
$m$ is $11-(o+n+p)$;
$n$ is 0, 1 or 2;
Z is an alkali metal, ammonium or $C_1$–$C_5$ alkyl-ammonium cation and
$a$ is 2 or 4.

6. The complex of claim 5 wherein said metal is palladium.

7. The complex of claim 5 wherein said metal is platinum.

8. The complex of claim 5 wherein said metal is rhodium.

References Cited

UNITED STATES PATENTS 3,409,650  11/1968  Knoth  260—429

OTHER REFERENCES

Warren et al.: J. Am. Chem. Soc., 89 (1967), pp. 470–471.

Young: Dissertation Abstracts, B27 (1967), pp. 3840–1.

TOBIAS E. LEVOW, Primary Examiner

A. P. DEMERS, Assistant Examiner

U.S. Cl. X.R.

23—361; 252—431; 260—606.5